E. M. STECKEL.
Hay-Tedder.

No. 168,424. Patented Oct. 5, 1875.

Witnesses:

Inventor:
Edward M. Steckel

UNITED STATES PATENT OFFICE.

EDWARD M. STECKEL, OF KUTZTOWN, PENNSYLVANIA.

IMPROVEMENT IN HAY-TEDDERS.

Specification forming part of Letters Patent No. 168,424, dated October 5, 1875; application filed October 3, 1874.

*To all whom it may concern:*

Be it known that I, EDWARD M. STECKEL, of Kutztown, in the county of Berks and State of Pennsylvania, have invented a new and Improved Hay-Tedding Attachment to Horse-Rakes and other implements or frame-work supported on wheels; and that the following is a full, clear, and exact description of the same, reference being had to the accompanying drawings and to the letters of reference marked thereon, making a part of this specification.

My invention relates to hay-tedders; and the invention consists in a new and improved combination of devices, whereby a hay-tedder, constructed as hereinafter described, may be readily and conveniently attached to or detached from a horse-rake, or other convenient implement or frame-work supported on wheels and axle, as hereinafter more fully set forth.

Figure 1:
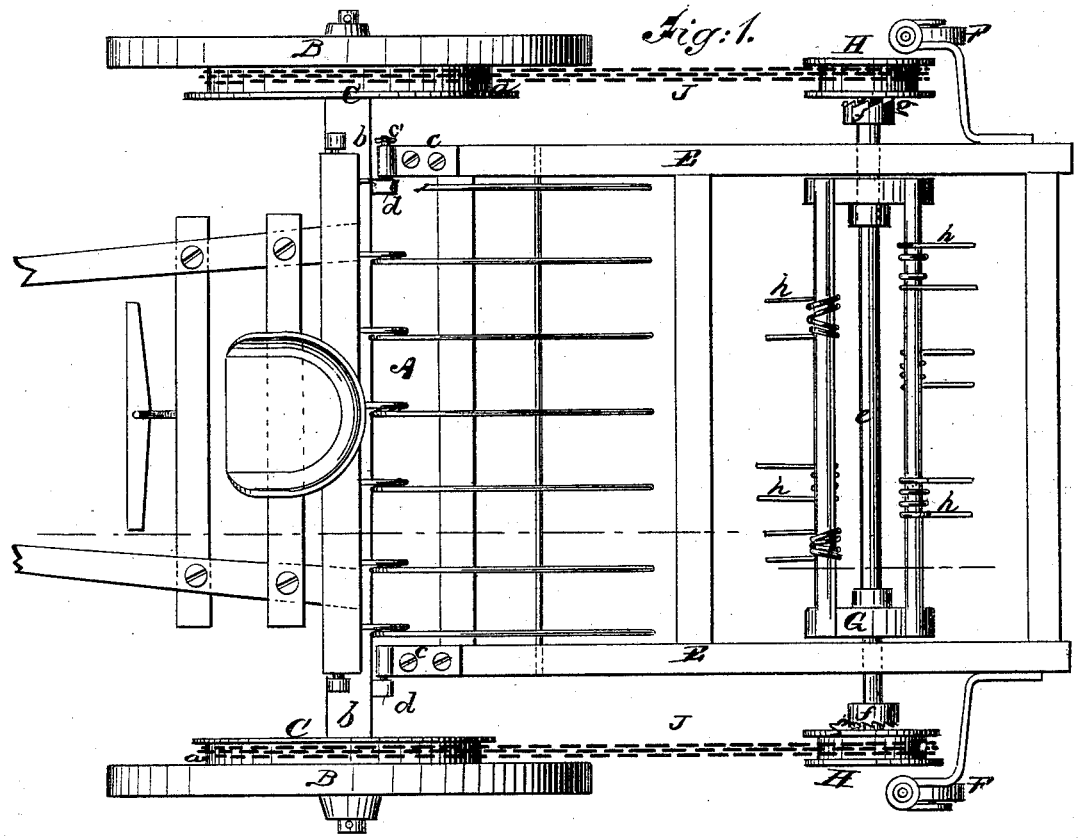
Figure 2:
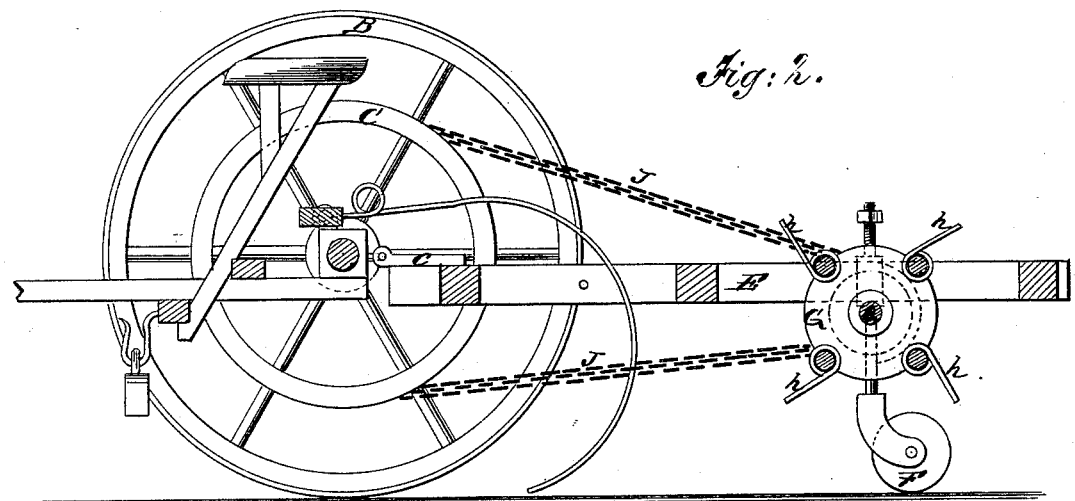

In the accompanying drawings, Figure 1 is a plan or top view of my improved hay-tedding attachment in connection with a horse-rake. Fig. 2 is a side view of the same, shown partly in section.

Referring to the parts by letters, A represents an ordinary horse-rake, to the inner sides of the wheels B of which are secured, in any suitable manner, pulleys C, having V-shaped grooves $a$ in their peripheries, said grooves being corrugated. Removably attached to the rear of the axle $b$ of the rake A, by adjustable or hinge joints $c$, is a frame-work, E, the rear end of which is supported on caster-wheels F. G is a reel, secured to and within the sides of the frame near its rear end. This reel is affixed to the frame E by resting in suitable bearings secured thereto, so that the shaft $e$, which passes axially through the reel, will turn freely in said bearings. To the outer ends of the shaft $e$ are attached pulley-wheels H, which are provided with a spring and ratchet device, $f$ $g$, which prevents the reel from revolving backward. The reel G is provided with a series of spring-tines, $h$. The frame E is attached to the axle $b$ by slipping the eyes of the plates $c$ onto the pivot-bolts or staples $d$, secured to the axle. It is then secured in position by passing a pin through the end of the bolt on the right-hand side, as shown at $c'$. The tedder-frame thus hinged is free to rise and fall as the machine passes over inequalities in the ground, the flexible nature of the chains or belts J J, by means of which motion is conveyed from the wheels or pulleys C to the pulleys H and revolving reel G, permitting of this automatic adjustment. The caster-wheels F are secured to bent arms, and placed so as to run clear of the tedder-reel, and pass over the hay without becoming clogged.

Having thus described my invention, what I claim as new, and desire to secure by Letters Patent, is—

The frame E, having the reel G, with tines $h$, operated as described, said frame being made attachable at its forward end to the axle of a horse-rake or other truck by means of the plates $c$, pivot-bolts $d$, and pin $c'$, so as to move freely in a vertical direction, and be readily detachable, substantially as set forth.

EDWARD M. STECKEL.

Witnesses:
PETER KRAUSE,
JONAS HOCH.